United States Patent Office 2,718,488
Patented Sept. 20, 1955

2,718,488
AMINE SALTS OF FUMAGILLIN

Richard U. Schock, Waukegan Township, Lake County, Ill., assignor to Abbott Laboratories, North Chicago, Ill., a corporation of Illinois No Drawing. Application December 17, 1953,
Serial No. 398,893

6 Claims. (Cl. 167—65)

This invention relates to amine salts of fumagillin and particularly to certain solid salts formed by the reaction of fumagillin with selected amines. The invention also relates to a method of making said salts.

Fumagillin is an antibiotic which has been found to be highly effective against *Endamoeba histolytica* and *Nosema apis*. It is a white, crystalline solid organic carboxylic acid, having a pK, as shown by electrometric titration, of about 6.5 and a melting point of 189–194° C. (Kopfler block) or 190–191° C. (capillary tube). It is optically active, having an $\alpha_D{}^{25}$ of −26.6° C. (0.25% in methanol). It contains only the elements carbon, hydrogen and oxygen, has the proximate empirical formula $C_{27}H_{36}O_7$ and contains in addition to a carboxyl group an alkoxyl group. Its molecular weight as calculated from its neutral equivalent is 475 and as calculated from the alkoxyl determination is 488. Further details on the identity of fumagillin are available in Hanson et al., U. S. Patent No. 2,652,356.

One serious limitation on the use of fumagillin occurs as a result of its pronounced instability in the presence of water. This instability coupled with the inherent insolubility of fumagillin in water has made it impossible to prepare and administer fumagillin in a liquid dosage form. A liquid dose form is essential to the administration of fumagillin by injection. In addition a liquid dose form is essential for the administration of fumagillin to bees in order to combat *Nosema apis*. It is desirable to add the medicament to a syrup which is being administered to the bees during their hibernation.

It is therefore a principal object of this invention to provide fumagillin activity in the form of chemical compositions which are stable and sufficiently soluble in water to provide a suitable dose of fumagillin.

In the accomplishment of this object and in accordance with the practice of this invention there is now provided a new class of chemical compositions which are crystalline or solid and which are soluble in water at least to the extent sufficient to provide suitable fumagillin activity in aqueous solution. These new chemical compositions are the products of the reaction of approximately equimolar proportions of fumagillin and an amine from the group consisting of decylamine, dodecylamine, dicycloxylamine and diamylamine.

The salts referred to in the preceding paragraph exhibit good stability in water, that is their fumagillin activity remains high upon storage. The salts also show undiminished fumagillin activity against *Nosema apis*. It is possible to recover pure fumagillin from the salts by contacting them with mineral acid.

The following examples are presented in order to describe the invention more clearly but it should be understood that the invention is not limited in any way by the examples.

Example I 1.00 gm. of fumagillin is dissolved in 50 cc. of boiling acetone and 0.7 cc. of decylamine is slowly added. After a short while the reaction mixture is chilled and a crystalline precipitate is formed. The precipitate is filtered and washed with acetone. The yield of crystalline material is 1.24 gm. which is found to have a melting point of 157–160° C., melting to a glass. The salt is recrystallized from 50% aqueous methanol and the recrystallized material melts at 163–165° C. to a glass.

*Anal.*—Calc. for $C_{26}H_{34}O_7 \cdot C_{10}H_{21}NH_2$: C, 70.21; H, 9.33; N, 2.28. Found: C, 70.24; H, 9.17; N, 2.25.

Example II

The dicyclohexylamine salt of fumagillin is prepared in the same manner set forth in detail in Example I. The yield is 1.39 gm. of crystalline material which has a melting point of 147–148° C. with darkening.

*Anal.*—Calc. for $C_{26}H_{34}O_7 \cdot C_{12}H_{22}NH$: C, 71.44; H, 8.84; N, 2.14. Found: C, 71.46; H, 8.75; N, 2.11.

Example III

The diamylamine salt of fumagillin is prepared in the same manner as in Example I but a somewhat lower yield is obtained because of the solubility in acetone. The crystalline salt obtained from the reaction has a melting point of 143–144° C. with darkening.

*Anal.*—Calc. for $C_{26}H_{34}O_7 \cdot C_{10}H_{22}NH$: C, 70.21; H, 9.33; N, 2.28. Found: C, 70.03; H, 9.24; N, 2.16.

Example IV

The dodecylamine salt of fumagillin is obtained in the manner shown in Example I. A yield of 0.91 gm. of solid material is obtained and the solid melts at 147–149° C.

*Anal.*—Calc. $C_{26}H_{34}O_7 \cdot C_{12}NH_2$: C, 70.99; H, 9.56; N, 2.18. Found: C, 70.21; H, 9.87; N, 2.30.

Others may practice this invention in any of the ways which will be suggested to one skilled in the art. All such practice is considered to be covered by the invention provided it falls within the scope of the appended claims.

I claim:

1. The solid, water-soluble product obtained by reacting approximately equimolar amounts of fumagillin and an amine selected from the group consisting of decylamine, dodecylamine, dicyclohexylamine and diamylamine.

2. The solid, water-soluble product obtained by reacting approximately equimolar amounts of fumagillin and decylamine.

3. The solid, water-soluble product obtained by reacting approximately equimolar amounts of fumagillin and dodecylamine.

4. The solid, water-soluble product obtained by reacting approximately equimolar amounts of fumagillin and dicyclohexylamine.

5. The solid, water-soluble product obtained by reacting approximately equimolar amounts of fumagillin and diamylamine.

6. A composition for the treatment of *Nosema apis* in bees which comprises an equeous solution of the solid, water-soluble reaction product of approximately equimolar amounts of fumagillin and an amine selected from the group consisting of decylamine, dodecylamine, dicyclohexylamine and diamylamine.

References Cited in the file of this patent

UNITED STATES PATENTS

| | | |
|---|---|---|
| 2,557,762 | Rawlins | June 19, 1951 |
| 2,585,512 | Staab | Feb. 12, 1952 |
| 2,647,893 | Young | Aug. 4, 1953 |
| 2,652,356 | Hanson et al. | Sept. 15, 1953 |
| 2,671,806 | Winterbottom | Mar. 9, 1954 |

OTHER REFERENCES

Kocholaty et al., Arch. of Biochem., Oct. 1947, pp. 55–64.